United States Patent [19]

Geidl et al.

[11] Patent Number: 5,388,488
[45] Date of Patent: Feb. 14, 1995

[54] MAT CUTTING SYSTEM

[75] Inventors: Verne Geidl, Troy, Id.; George Delgado, Anchorage, Ak.; David Hudspeth, Anchorage, Ak.; Randall Berry, Anchorage, Ak.

[73] Assignee: Arago Robotics Incorporated, Anchorage, Ak.

[21] Appl. No.: 944,452

[22] Filed: Sep. 14, 1992

[51] Int. Cl.⁶ .......................... B26D 3/00; B26F 1/38
[52] U.S. Cl. ........................................ 83/56; 83/76.8; 83/455; 83/581; 83/940
[58] Field of Search ................... 83/52, 56, 76.1, 76.6, 83/76.7, 76.8, 76.9, 455, 465, 581, 936–940

[56] References Cited

U.S. PATENT DOCUMENTS

| | | | |
|---|---|---|---|
| 3,522,753 | 8/1970 | Schmied | 83/471 |
| 3,841,187 | 10/1974 | Gerber et al. | 83/451 |
| 3,967,519 | 7/1976 | Esterly | 83/455 |
| 3,978,748 | 9/1976 | Leslie et al. | 83/76.8 X |
| 4,200,015 | 4/1980 | Gerber | 83/56 X |
| 4,448,808 | 5/1984 | Pearl | 83/940 X |
| 4,599,925 | 7/1986 | Rom | 83/56 |
| 4,624,169 | 11/1986 | Nelson | 83/881 |
| 4,641,556 | 2/1987 | Vigneron et al. | 83/36 |
| 4,662,258 | 5/1987 | Mood | 83/455 |
| 4,793,033 | 12/1988 | Schneider et al. | 83/940 X |
| 4,920,495 | 4/1990 | Pilkington | 83/76.7 X |

FOREIGN PATENT DOCUMENTS

| | | |
|---|---|---|
| 2610238 | 8/1988 | France . |
| 8703286 | 5/1987 | Germany . |
| 2057956A | 4/1981 | United Kingdom . |

*Primary Examiner*—Eugenia Jones
*Attorney, Agent, or Firm*—Wells, St. John, Roberts, Gregory & Matkin

[57] ABSTRACT

A system for cutting windows or openings in mats used in framing works of art. The system involves the use of a variably positionable head to which a cutting blade is attached for cutting a beveled edge in the mat. A longitudinal drive means, transverse drive means, and orthogonal drive form a combined positioning device capable of moving the head in any direction. A rotational drive means may also form part of the combined positioning device for rotating and adjusting the position of the blade. A linear variable displacement transducer is coupled to the head and operatively coupled to the orthogonal drive to maintain the head a constant distance away from the mat so the blade cuts a continuously smooth beveled edge in the mat.

37 Claims, 9 Drawing Sheets

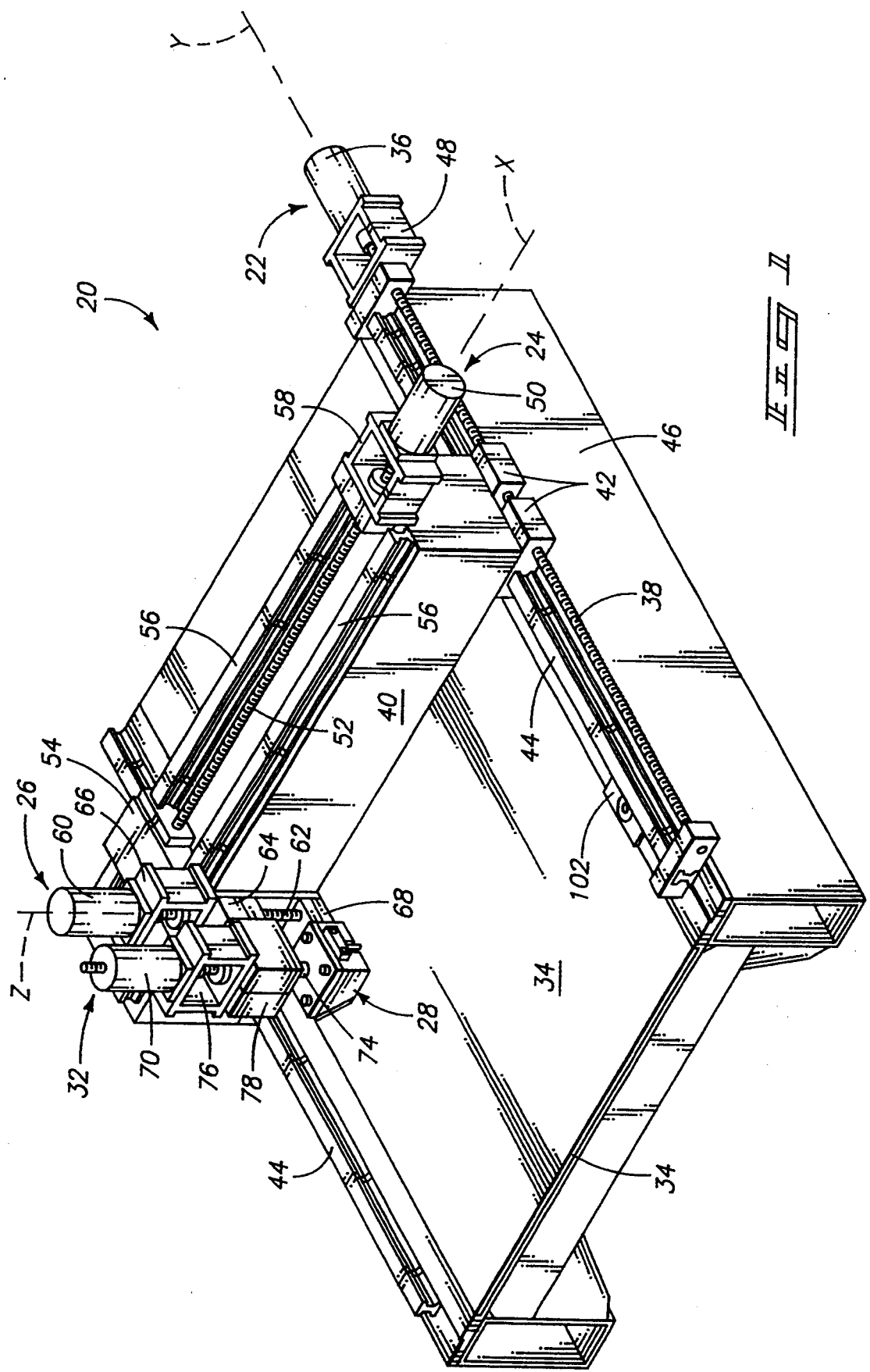

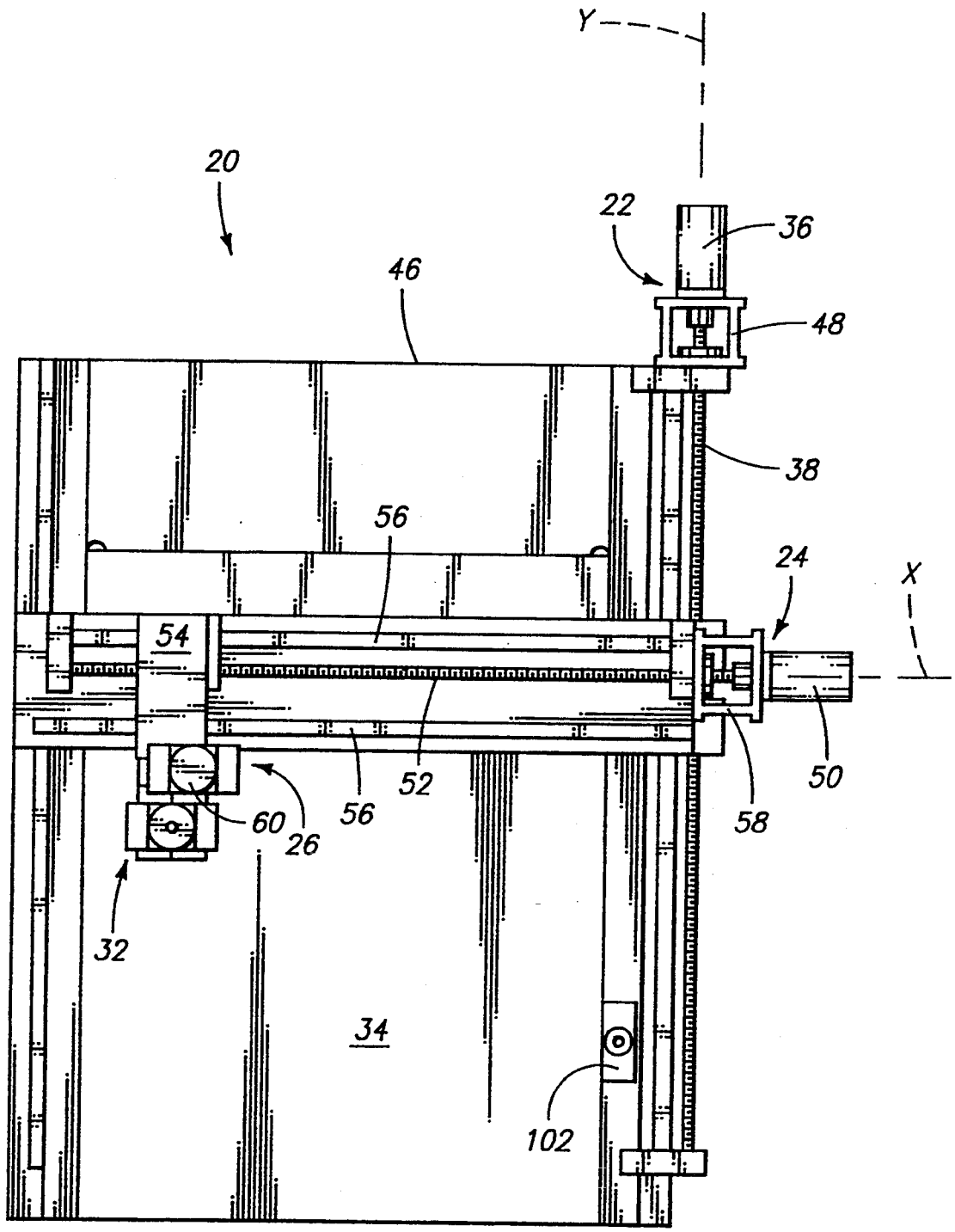

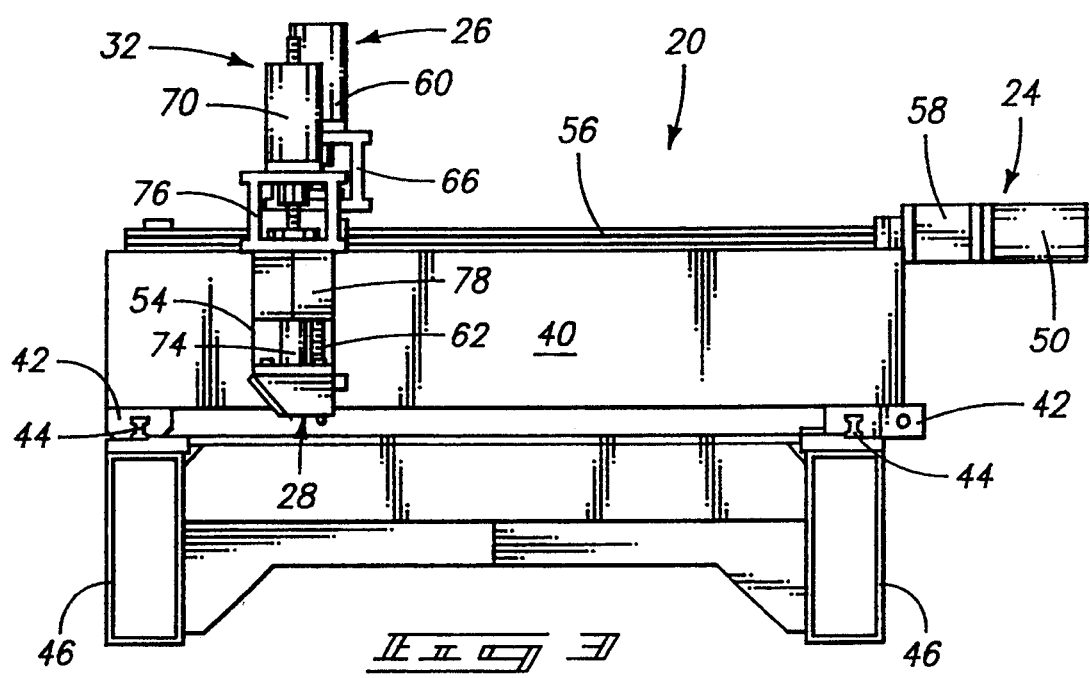
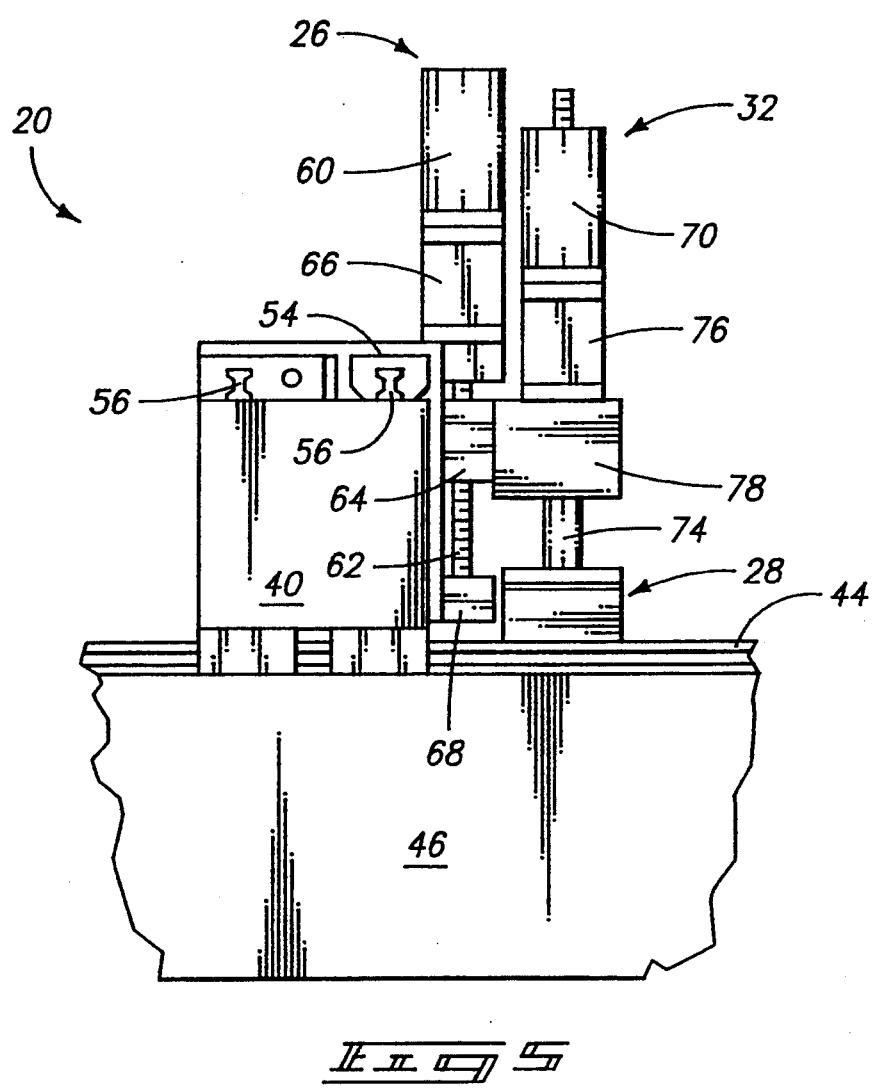

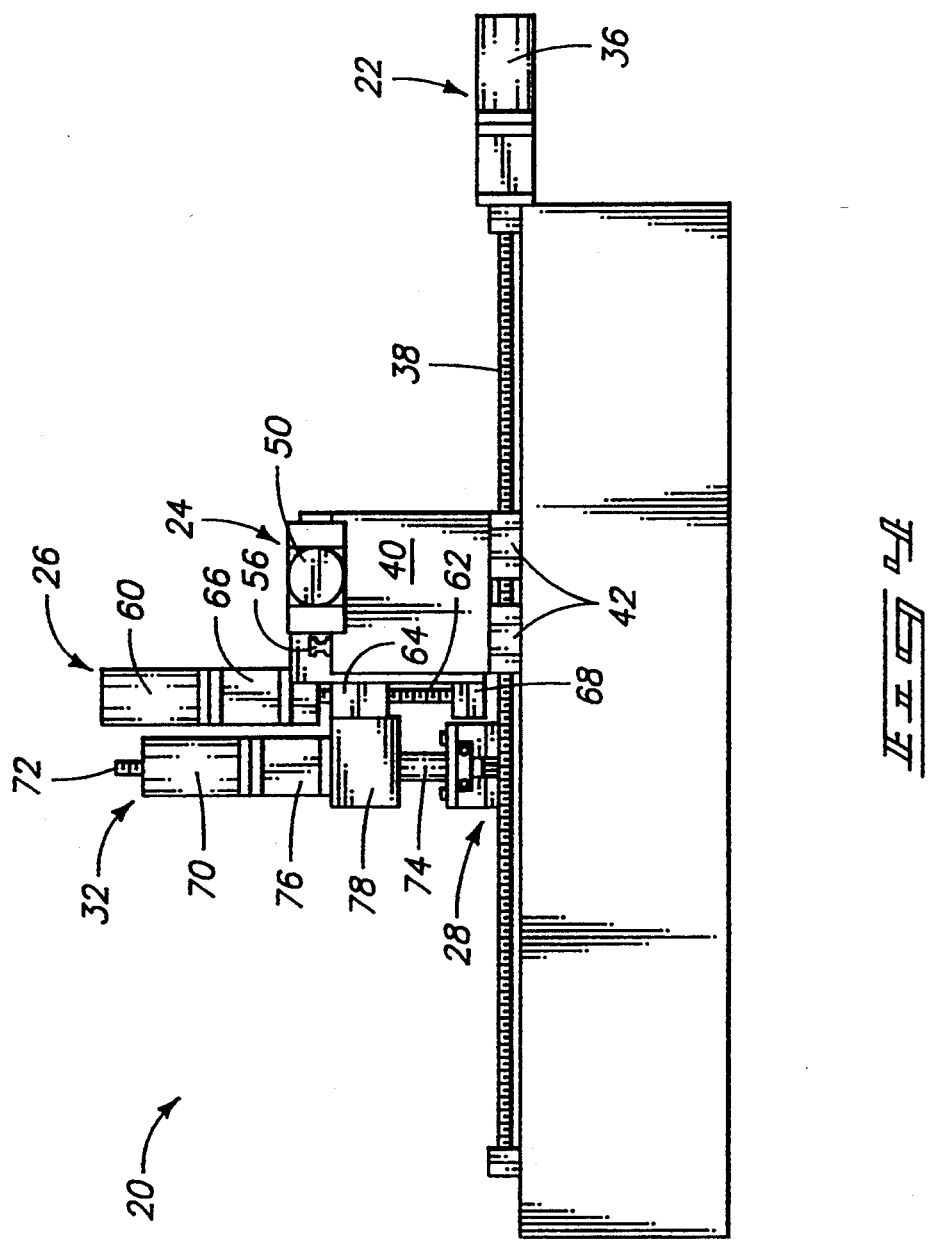

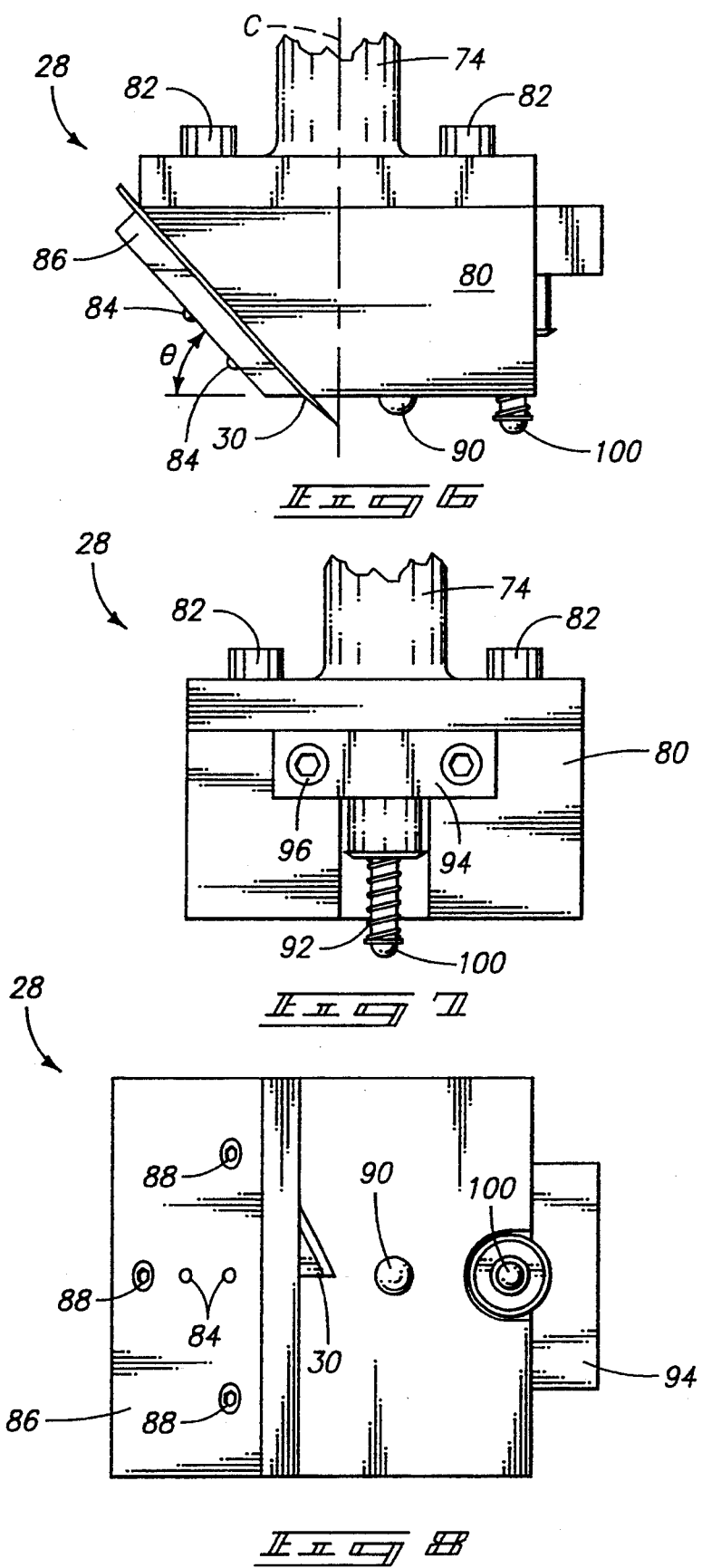

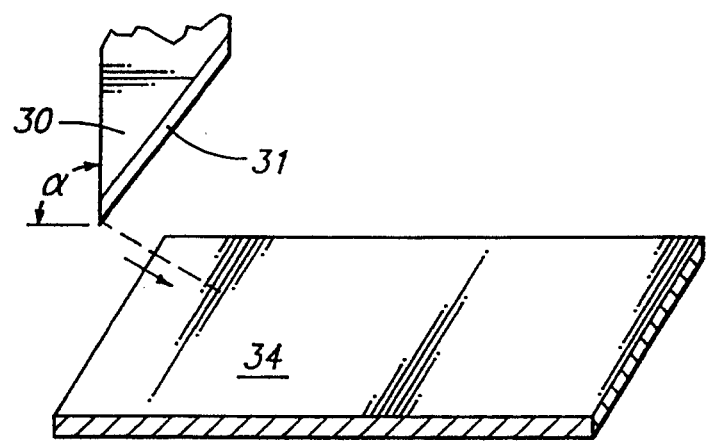
_FIG 9_
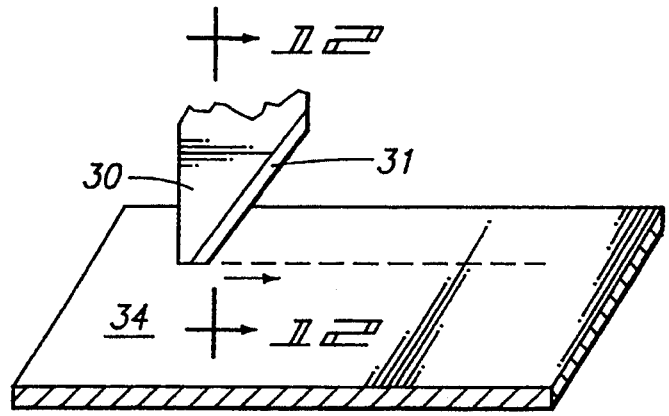
_FIG 10_
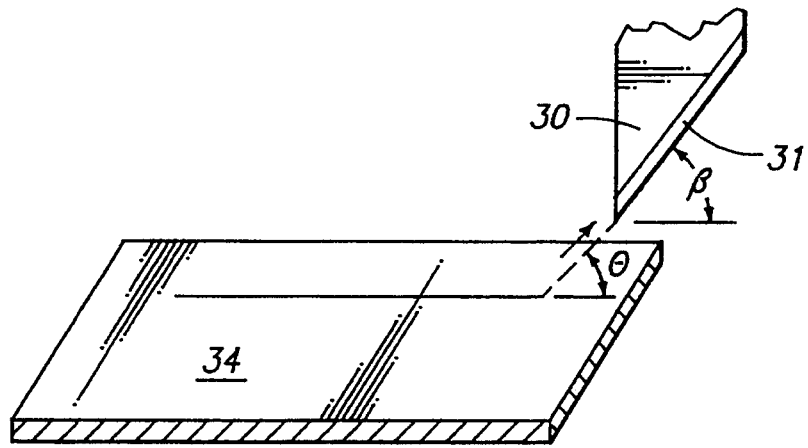
_FIG 11_

MAT CUTTING SYSTEM

TECHNICAL FIELD

This invention relates to systems for cutting openings, windows, or decorative carvings in mats used in framing artwork.

BACKGROUND OF THE INVENTION

Mats are commonly used as borders for framing works of art, such as a photographs, paintings, sketches, and other types of display works. A single mat may be used as a border for the artwork or, alternatively, several mats with different sized openings may be used to form a spectrum of mat borders about the periphery of the framed work. The purpose of a mat border is to enhance the visual appearance of the artwork and to render the frame compatible with the other items in the room.

Mats are generally formed by cutting a window or opening into a full-sized sheet or blank of mat material. The most traditional manner of cutting the windows or openings in mats has been by hand. A person cutting the mat positions a guide along a reference line where the cut is to be made and then passes a cutting blade along the guide to make the cut.

In addition to an opening or window, mats are sometimes decorated with freehand carvings. Such carvings are time-consuming and labor intensive. Sometimes carvings are made using a manual, mat cutting machine, but the shape of such carvings is limited to straight lines, circles, or ovals. These carvings also require much manual labor and time.

A major deficiency with respect to virtually all prior systems for cutting mats relates to overcuts in the mat material. Overcuts have traditionally been required in cutting beveled edges to form the openings.

Another problem encountered in traditional systems of mat cutting is that the mat can be damaged from the clamps that hold the mat to the surface of the cutting table. This problem is accentuated when, as required by most traditional methods, the mat is rotated to effect the typical four cuts required for a rectangular window because the clamps must be repeatedly installed and removed.

One attempt to solve the problems of overcuts has been to place the mat upside down when it is being cut. By so doing, the overcuts will be the most visible from the back of the mat. However, the mat must be inverted before it can be inspected to ensure that a proper cut has been made. Therefore, the overcuts still occur where the two beveled edges of the mat meet at a typical 90° corner of a rectangular frame.

Turning the mat upside down for cutting has served to reduce damage and marks made by clamps. The damage still occurs when clamps are used, although the damaged side is not visible when the mat is placed in the frame. Perhaps more importantly, the mat must be inverted before it can be inspected to ensure that a proper cut has been made.

Another limitation with respect to prior methods of cutting windows in mats relates to the shape of the window. Although some traditional hand-operated cutting devices are capable of cutting circular or oval cuts in mats, the vast majority of mat cutting systems are designed to cut rectangular-shaped windows in mats. For example, U.S. Pat. No. 4,641,556 discloses a mat cutter for cutting rectangular windows in a stock of mats by directing two separate blades in two mutually perpendicular directions to make two perpendicular cuts, rotating the mat 180°, then reversing the direction of the two blades to complete the remaining perpendicular cuts. However, this device requires two cutting blades, each with two opposite cutting edges and is limited to cutting rectangular-shaped openings.

A major reason that current mat cutters are so limited in their capabilities is because of the unique problems of cutting beveled edges in the mat. A beveled edge gives the mat a pronounced visual effect inside the frame. Almost all mats are cut with beveled edges (as opposed to vertical edges) at the periphery of the opening or decorative carving. Such beveled edges are generally cut at a 45° angle, relative to the top surface of the mat.

A continuously smooth beveled edge can be cut only when the inclined knife passes through the mat at a constant depth relative to the top surface of the mat. When beveled cuts involve curvilinear edges or intersecting straight edges, it is highly difficult to produce smooth, continuously beveled edges, and intersecting cuts without overcuts. This is especially true with respect to a curvilinear edge that has a reverse curvature, such as an S-shaped edge, and to corner angles other than 90°. Because of this difficulty, traditional cutters cannot make reverse curvature cuts, linear-to-curvilinear cuts, or curvilinear-to-linear cuts in the same operation. It is also the reason they are limited only to making linear, oval, and circular cuts, without the ability to make decorative carvings or openings of various shapes.

Accordingly, there is a need to develop a system for cutting mats lo that is capable of automatically cutting one or more decorative carvings of any shape, including reverse curvature beveled cuts, and openings of any size or shape, including reverse curvature beveled cuts, in a mat, that will cut the openings or carvings with a continuously smooth beveled edge without any overcuts, that does not require any rotation of the mat during cutting, and that can perform such cutting quickly and automatically.

The foregoing deficiencies in traditional mat cutting techniques have been overcome by the present invention, which involves an automatic system for cutting windows, openings, and decorative carvings in mats. The system involves use of a variably positionable head to which a cutting blade is attached for cutting a beveled edge in a mat without any overcuts. A longitudinal drive means, transverse drive means, and orthogonal drive means (i.e., perpendicular to the surface of the mat) form a combined positioning means capable of moving (i.e., translating) the head in any direction. A rotational drive means may also form part of the combined positioning means to rotate the blade and adjust the position of the blade as a linear or curvilinear beveled edge is cut into the mat. A linear variable displacement transducer (LVDT) is coupled to the head and is operatively coupled to the orthogonal drive means to maintain the head a constant distance away from the mat so the blade cuts a continuously smooth beveled edge in the mat. Other objects and advantages of the invention will become apparent from the detailed description of the invention which follows.

BRIEF DESCRIPTION OF THE DRAWINGS

One or more preferred forms of the invention are described herein with reference to the accompanying drawings. The drawings are briefly described below.

FIG. 1 is an isometric view of a preferred embodiment of the mat cutting device according to the present invention.

FIG. 2 is a top plan view of the mat cutting device of FIG. 1.

FIG. 3 is a front elevational view of the mat cutting device of FIG. 1.

FIG. 4 is a right side elevational view of the mat cutting device of FIG. 1.

FIG. 5 is a partial left side elevational view of the mat cutting device of FIG. 1.

FIG. 6 is a front elevational view of a preferred embodiment of a head including a cutting blade as shown in the mat cutting device of FIG. 1.

FIG. 7 is a right side elevational view of the head of FIG. 6.

FIG. 8 is a bottom view of the head of FIG. 6.

FIGS. 9–11 are isometric schematic views showing a cutting blade being inserted into a mat, cutting the mat, and being removed from the mat.

DETAILED DESCRIPTION OF THE PREFERRED EMBODIMENTS

Figure 12:
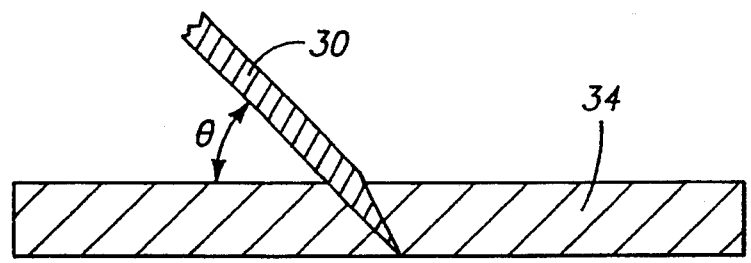
FIG. 12 is a sectional side elevational view, taken along the line 12—12 of FIG. 10, showing the cutting blade at an inclined angle for cutting a beveled edge in the mat.

This disclosure of the invention is submitted in furtherance of the constitutional purposes of the U.S. Patent Laws "to promote the progress of science and useful arts" (Article 1, Section 8).

FIG. 1 shows a preferred embodiment of a mat cutter 20 for cutting or carving openings, windows, and decorative carvings in a standard stock of mat material. The mat cutter 20 includes a longitudinal drive means 22, a transverse drive means 24, and an orthogonal drive means 26. The drive means 22, 24, 26 form a combined positioning means to move (i.e., translate) a head 28 and a connected cutting blade 30 (FIG. 6) aligned for cutting an opening or decorative carving in the mat. In a preferred embodiment, a rotational drive means 32 is also included in the combined positioning means to rotate the head 28 about an orthogonal axis and vary the alignment of the blade 30. The combined positioning means allow the cutting blade 30 to be cuttingly inserted into the mat and thereafter moved in any desired direction to cut a precision opening or decorative carving of any shape with beveled edges into the mat 34.

Referring to FIGS. 1, 2 and 4, the longitudinal drive means 22 comprises a longitudinal stepper motor 36 which turns a lead screw 38 to move a truck 40 mounted on blocks 42 along opposite rails 44. This causes the head 28 to move in a longitudinal or Y-axis direction. The longitudinal stepper motor 36 is secured to the frame structure 46 of the mat cutter by means of a mounting bracket 48. The longitudinal drive means 22 allows precise bidirectional movement of the truck 40 and attached head 28 for cutting the mat 34. In a preferred embodiment, conventional limit switches (not shown) are coupled to the mat cutting device 20 at the extreme ends of lead screw 38 to limit longitudinal movement of the truck 40.

With reference to FIGS. 1–3, the transverse drive means 24 of the mat cutter 20 comprises a transverse stepper motor 50 which rotates a lead screw 52 to move a transverse truck 54 along a pair of transverse guide rails 56. The transverse stepper motor 50 is secured to the longitudinal truck 40 by means of a mounting bracket 58. The transverse drive means 24 allows for precise, incremental movement of the transverse truck 54 (and attached head 28) in a transverse or X-axis direction. In a preferred embodiment, conventional limit switches (not shown) are coupled to the mat cutting device 20 at the extreme ends of lead screw 52 to limit transverse movement of the truck 54.

Referring now to FIGS. 1, 4–5, the orthogonal drive means 26 includes an orthogonal stepper motor 60 which rotates a lead screw 62 to move a truck 64 along the lead screw 62 either toward or away from the mat 34. The orthogonal stepper motor 60 is secured to the transverse truck 54 by means of mounting bracket 66. The orthogonal drive means allows the truck 64 and attached head 28 to be moved incrementally toward and away from the mat 34 in an orthogonal or Z-axis direction perpendicular to the longitudinal and transverse directions. In a preferred embodiment, conventional limit switches (not shown) are coupled to the mat cutting device 20 at the extreme ends of lead screw 62 to limit orthogonal movement of the truck 64.

Referring still to FIGS. 1, 3–5, the mat cutter 20 further includes a rotational drive means 32, including a rotational stepper motor 70 which turns a shaft 74, which is coupled, in turn, to the head 28. The stepper motor 70 is secured to the shaft housing 78 by means of a mounting bracket 76. The shaft housing 78 is attached to the truck 64 by means of conventional fasteners. The rotational drive means 32 allows the head 28 to be precisely and incrementally rotated 360° about the orthogonal or Z axis to align the cutting blade 30 (FIG. 6) in any desired orientation.

The longitudinal drive means 22, the transverse drive means 24, the orthogonal drive means 26, and the rotational drive means 32 form a combined positioning means which allows the position of the cutting blade 30 to be precisely and incrementally moved in any direction to initially insert the cutting blade 30 into the mat 34, to then cut a beveled edge in the mat 34, and to subsequently remove the cutting blade 30 from the mat 34 without overcutting the mat. Each of the drive means 22, 24, 26, 32 can be actuated independently or simultaneously to cut a beveled edge along a straight path, a curvilinear path, a reverse curvilinear path, or any other path. With respect to the head 28, as shown in FIGS. 6-9, the head of the mat cutting device 20 includes a blade support block 80 which is connected to the shaft 74 by means of connecting screws 82. The blade support block 80 includes an inclined surface against which the cutting blade 30 is attached. The cutting blade 30, which includes an edge 31, is positioned over a pair of positioning pins 84. A face plate 86 is positioned over the pins 84 and cutting blade 30 and secured to the blade support block 80 by means of fasteners 88. As shown in FIGS. 6 and 8, it is critical that the tip of the cutting blade 30 be accurately positioned with respect to the central axis C of the shaft 74.

Referring to FIGS. 6–8, a ball plunger 90 is provided on the blade support block 80 and is biased toward the surface of the mat (not shown) by a spring 92. The purpose of the ball plunger is to hold down the mat while the cutting blade 30 cuts the mat 34 (FIG. 12). The mat 34 may also be held within a recessed area on the working surface by a doubled-sided adhesive tape to prevent movement of the mat.

One advantage of the present invention is that the blade support block 80 can be readily interchanged with an alternative blade support block to vary the angle Θ at which the bevel is cut into the mat. Although a preferred angle Θ for cutting a beveled edge is 45°, it is understood that any desired angle of beveled edge may be cut into the mat using the present mat cutting system. This is a major advantage of the present invention, since traditional manual mat cutters are limited to angles Θ, for the beveled edge, of 45°. Fasteners 82 render the blade support block 80 readily exchangeable with an alternative block.

Another important aspect of the present invention involves a linear variable displacement transducer (LVDT) 100 which is coupled to the blade support block 80 to control the elevation of the tip of the cutting blade 30 with respect to the top of the mat. The LVDT 100 is secured to the blade support block 80 by means of mounting plate 94 and corresponding fasteners 96. The LVDT 100 is biased toward the mat by a spring 92. The LVDT ensures a precise joint at the location where two edges meet without overcuts or undercuts. The LVDT senses, at all times, the top surface of the mat 34 which is being cut to provide input to the orthogonal stepper motor to maintain a constant distance between the bottom surface of blade support block 80 and the surface of the mat 34. This feature is important because the surface of a stock of mat material may have bumps and other irregularities which must be compensated for when cutting a beveled edge. Otherwise, the vertical distance between the blade support block 80 and the surface of the mat will vary. This variation causes the horizontal position of the cut line to shift in a direction perpendicular to the line, resulting in crooked lines.

Further, without maintaining the blade 30 at a constant distance relative to the mat 34, the corner where two separate cuts have been made may not match, resulting in overcuts or undercuts. Although some self-correction will occur when 90° angle corners are cut, the problem is inevitable when the corners are at angles other than 90°. A similar problem will occur with intersecting curved lines. It is a primary object of the present invention to enable the precise union of two intersecting curved lines.

To calibrate the tip of cutting blade 30, a touch pad 102 (FIGS. 1 and 2) is provided at one side of the working surface on which the mat 34 is placed. Before cutting is initiated, the tip of the cutting knife 30 is positioned over the center of touch pad 102 so that the elevation of the blade is recorded using the LVDT 100 in the controlling software.

With knowledge of the exact location of the tip of the cutting blade 30, it can be inserted into the mat precisely the distance required to cut the mat. Therefore, a waste mat (not shown), which is generally positioned below the mat to be cut, can be used indefinitely because of its minimum penetration by cutting blade 30.

Figure 15:
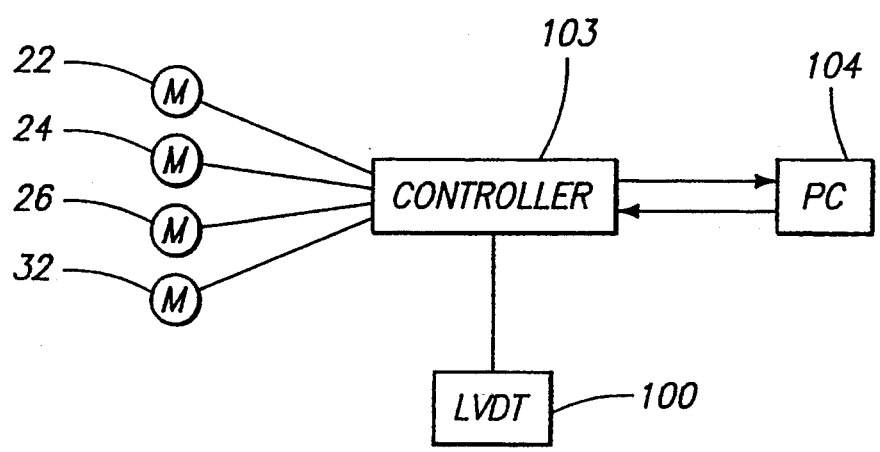
FIG. 15 is a schematic drawing showing the operative connections between the each of the drive means, the controller, the LVDT, and the computing means.

FIG. 15 is a schematic showing the interrelationship between the various drive means 22, 24, 26, 32, the controller 103, the LVDT 100 and the computing means 104. The computing means can be any suitable personal computer (PC). Specialized software allows the operator of the PC to input the data relating to the precise dimensions and location of the area to be cut. The information is received by the controller 103 which selectively activates the various drive means 22, 24, 26, 32, alone or simultaneously. The LVDT 100 provides information to the controller 103 which activates the orthogonal drive means 26 to maintain the blade support block 80 a constant distance from the top surface of the mat.

In operation, and with reference to FIGS. 9–11, after the tip of the knife 30 has been calibrated at the touch pad 102, the cutting blade 30 is positioned above the mat at a location for cutting. When the mat cutting device 20 is used to cut a beveled edge in the mat, the cutting blade 30 must be moved in three directions (in the X, Y, and Z axial directions) as it is inserted into the mat 34. That is, the longitudinal drive means 22, the transverse drive means 24, and the orthogonal drive means 26 must simultaneously be actuated (FIG. 9) so that the cutting blade is cuttingly inserted into the mat 34 to cut a precision opening with a beveled edge that, in the end, will produce no overcuts or undercuts.

It should be noted that the cutting angle $\beta$ (i.e., the attack angle) between the leading or cutting edge 31 of the blade 30 and the surface of the mat must be greater than or equal to the angle Θ of the beveled edge to prevent overcutting the mat when the blade is cuttingly removed from the mat. In addition, the angle $\alpha$ between the trailing edge of the blade 30 and the surface of the mat must also be greater than or equal to the angle Θ of the beveled edge so that the trailing edge does not drag when the blade is cuttingly inserted into the mat.

After the cutting blade 30 has been inserted into the mat 34 a desired distance, the longitudinal drive means 22 and the transverse drive means 24 are actuated to move the blade 30 along a linear path (FIG. 10). If the blade follows a curvilinear path, the rotational means 32 must simultaneously be actuated to change the orientation of the blade 30 and maintain it in alignment with the instantaneous path of movement of the head 28. The LVDT 100 will sense the surface of the mat 34 and send a signal to actuate the orthogonal drive means 26 if necessary to maintain a consistently smooth beveled edge.

When the cut is completed, the cutting blade 30 is then removed by moving the knife blade in the X, Y, Z directions (FIG. 11) by means of the transverse, longitudinal, and orthogonal drive means, respectively. This will cut the thickness of the mat while the blade 30 is being removed to complete precise intersection where the blade 30 had previously been or will subsequently be cuttingly inserted. No overcuts or undercuts in the mat material will occur.

Figure 13:
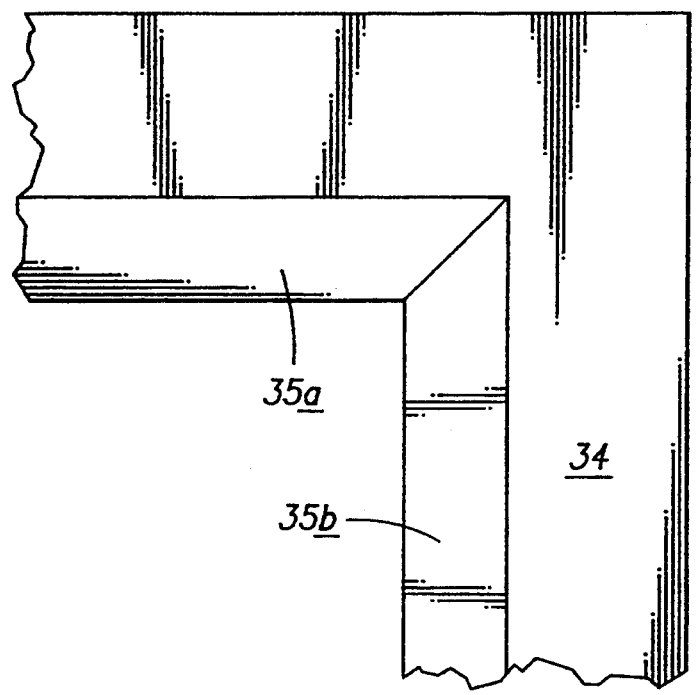
FIG. 13 is a partial top plan view of a mat with beveled edges that meet at a 90° corner without overcuts.

When separate adjoining cuts are to be made, the rotational drive means will rotate the head 28 after the blade 30 has been removed from the mat 34 to correspond with the adjacent path. The cutting blade 30 is then again cuttingly inserted into the mat 34 by moving the mat in the X, Y, and Z directions. FIG. 13 shows a rectangular opening having beveled edges 35$a$, 35$b$ which have been cut into the mat 34. As is shown, the corner where the beveled edges 35a, 35b meet is precisely formed without overcutting the mat. Since the mat is always cut with the preferred side up, the mat can be continuously visually inspected to ensure proper cuts have been made.

Figure 14:
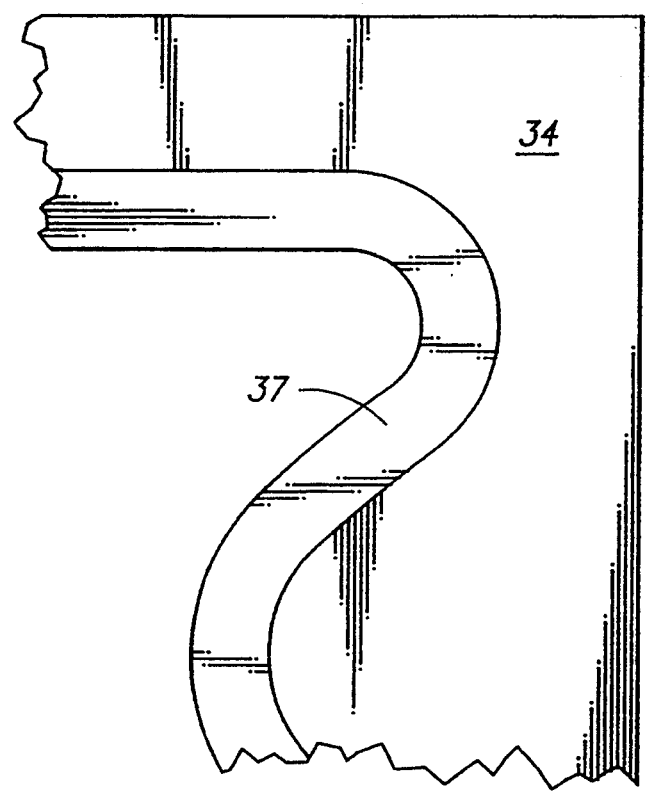
FIG. 14 is a partial top plan view of a mat having a curvilinear beveled edge.

With reference to FIG. 14, it can be seen that a curvilinear opening with a continuously smooth beveled edge 37 can be produced by the mat cutting or carving device 20. The present mat cutting device 20 is capable of not only producing an opening with a single curved edge, but also of reversing the direction of curve and maintaining a precision beveled edge 37. This again is made possible by the combined positioning means, including the longitudinal drive means 22, the transverse drive means 24, the orthogonal drive means 26, and the rotational drive means 32. Further, LVDT 100 maintains a constant distance between the head and the mat being cut so that the tapered or beveled edge 37 is constant without irregularities.

Figure 16:
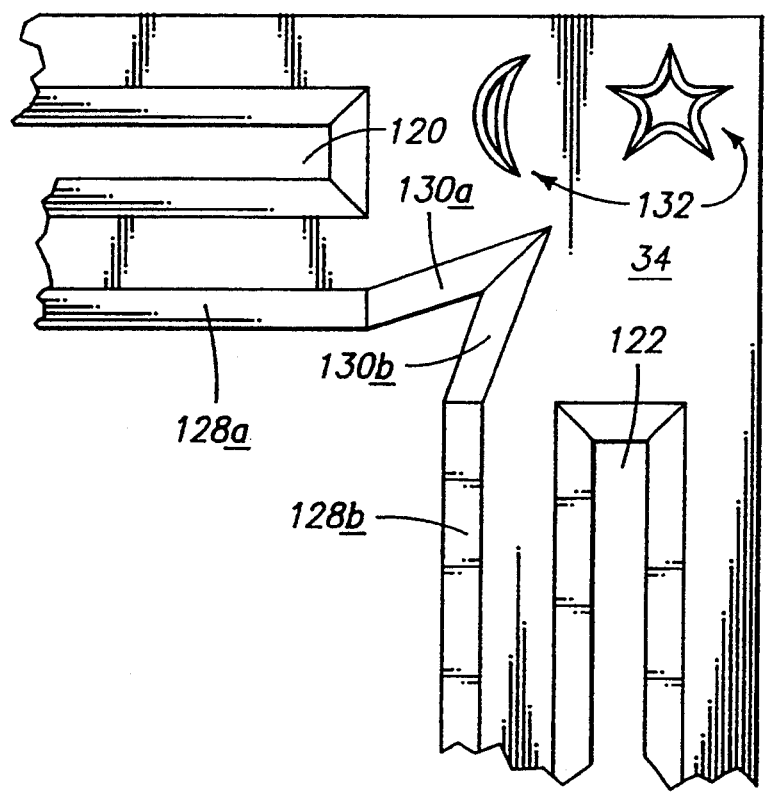
FIG. 16 is a partial top plan view of a mat having multiple openings with beveled edges, decorative carvings, and a main opening with beveled edges that meet at an angle of less than 90° at the corner without overcuts.

Referring now to FIG. 16, another primary advantage of the present invention is that it is capable of cutting multiple, separate openings 120, 122 and various forms and shapes of decorative carvings 132 in the mat 34 without the need to remove or reposition the mat. The decorative carvings could be cut with beveled edges or vertical edges. Also, unlike traditional manual mat cutting devices, the present system is capable of cutting a beveled edges 128a, 128b that precisely align with beveled edges 130a, 130b, which form a precise corner of the main opening in the mat at an angle other than 90°. Therefore, the various designs, openings, windows, and decorative carvings the present mat cutting system is capable of producing are virtually unlimited.

In compliance with the statute, the invention has been described in language necessarily limited in its ability to properly convey the conceptual nature of the invention. Because of this inherent limitation of language, it must be understood that the invention is not necessarily limited to the specific features described, since the means herein disclosed comprise merely preferred forms of putting the invention into effect. The invention is, therefore, claimed in any of its forms or modifications within the proper scope of the appended claims appropriately interpreted in accordance with the doctrine of equivalents.

We claim:

1. A device for cutting precision openings in mats used for framing artwork, comprising:
   a cutting blade having a cutting tip and a cutting edge for cutting a precision opening in a mat;
   a variably positionable head for holding the cutting blade;
   longitudinal drive means for moving the head in a first axial direction parallel to a top surface of the mat;
   transverse drive means for moving the head in a second axial direction parallel to the mat surface;
   orthogonal drive means for moving the head in a third axial direction intersecting the mat surface;
   the longitudinal, transverse, and orthogonal drive means forming a combined positioning means for simultaneously, directly and controllably moving the head in each of the first, second, and third axial directions when cutting the mat;
   the combined positioning means simultaneously and controllably moving the cutting tip in the first, second, and third axial directions as the blade is cuttingly inserted into and removed from the mat in a direction parallel to a preselected acute angle relative to the top surface of the mat such that the blade cuts the precision opening without making overcuts in the mat.

2. A mat cutting device of claim 1, further comprising:
   rotational drive means for rotating the head about an axis perpendicular to the mat surface to align the blade along a cutting path along the mat surface when cutting the mat.

3. A mat cutting device of claim 1, further comprising:
   rotational drive means for rotating the head to change the alignment of the cutting blade as the mat is being cut along a cutting path on the mat surface.

4. The mat cutting device of claim 1 wherein the cutting blade is a single-edge blade which forms the opening by cutting a beveled edge about the entire periphery of the opening.

5. The mat cutting device of claim 1 wherein the head includes
   a blade support block for holing the cutting blade, the cutting blade being inserted into the mat to a predetermined and controlled cutting depth; and
   a plunger connected to the blade support block to force the mat against a working surface to enable the orthogonal drive means to precisely control the cutting depth of the blade while the opening is being cut in the mat.

6. The mat cutting device of claim 1, further comprising: calibration means for calibrating the position of the cutting tip for precision cutting of the mat.

7. The mat cutting device of claim 1 wherein the combined positioning means is capable of guiding the cutting blade to cut multiple, separate openings into the mat in a single operation without moving the mat.

8. The mat cutting device of claim 1 wherein the combined positioning means is capable of guiding the cutting blade to cut decorative carvings into the mat wherein the carvings consist of any combination of curvilinear and linear lines in a single operation without moving the mat.

9. A device for cutting precision openings in mats used for framing artwork, comprising:
   a cutting blade having a cutting edge for cutting an opening in a mat;
   a variably positionable head for holding the cutting blade;
   longitudinal drive means for moving the head in a first axial direction parallel to a top surface of the mat;
   transverse drive means for moving the head in a second axial direction parallel to the mat surface;
   orthogonal drive means for moving he head in a third axial direction intersecting the rant surface;
   the longitudinal, transverse, and orthogonal drive means forming a combined positioning means for controlling simultaneous movement of the head in the first, second, and third axial directions when cutting the mat;
   the cutting blade being cuttingly inserted into and removed from the mat in a direction parallel to a preselected angle relative to the top surface of the mat to cut the opening precisely without making overcuts in the mat;

wherein the cutting blade is inclined relative to the mat surface to cut an even, beveled edge in the mat.

10. A device for cutting precision openings in mats used for framing artwork, comprising:
a cutting blade having a cutting edge for cutting an opening in a mat;
a variably positionable head for holding the cutting blade;
longitudinal drive means for moving the head in a first axial direction parallel to a top surface of the mat;
transverse drive means for moving the head in a second axial direction parallel to the mat surface;
orthogonal drive means for moving the head in a third axial direction intersecting the mat surface;
the longitudinal, transverse, and orthogonal drive means forming a combined positioning means for controlling simultaneous movement of the head in the first, second, and third axial directions when cutting the mat;
the cutting blade being cuttingly inserted into and removed from the mat in a direction parallel to a preselected angle relative to the top surface of the mat to cut the opening precisely without making overcuts in the mat;
wherein the cutting blade is inclined at a 45° angle relative to the mat surface so that the blade cuts an even 45° beveled edge in the mat.

11. A device for cutting precision openings in mats used for framing artwork, comprising:
a cutting blade having a cutting edge for cutting an opening in a mat;
a variably positionable head for holding the cutting blade;
longitudinal drive means for moving the head in a first axial direction parallel to a top surface of the mat;
transverse drive means for moving the head in a second axial direction parallel to the mat surface;
orthogonal drive means for moving the head in a third axial direction intersecting the mat surface;
the longitudinal, transverse, and orthogonal drive means forming a combined positioning means for controlling simultaneous movement of the head in the first, second, and third axial directions when cutting the mat;
the cutting blade being cuttingly inserted into and removed from the mat in a direction parallel to a preselected angle relative to the top surface of the mat to cut the opening precisely without making overcuts in the mat;
wherein the cutting blade is inclined relative to the top surface of the mat, and further comprising:
rotational drive means for rotating the head to change the alignment of the cutting blade as the mat is being cut along a cutting path on the mat surface;
a linear variable displacement transducer operatively coupled to the orthogonal drive means and connected to the head for sensing the mat surface contemporaneously while cutting the mat, the linear variable displacement transducer maintaining the head a constant distance from the top surface of the mat so that the inclined blade cuts a smooth, continuous edge in the mat.

12. The mat cutting device of claim 11 wherein the edge is cut along a straight line.

13. The mat cutting device of claim 11 wherein the edge is cut along a curvilinear line.

14. The mat cutting device of claim 11 wherein the edge is cut along a curvilinear S-shaped line.

15. A device for cutting precision openings in mats used for framing artwork, comprising:
a cutting blade having a cutting edge for cutting an opening in a mat;
a variably positionable head for holding the cutting blade;
longitudinal drive means for moving the head in a first axial direction parallel to a top surface of the mat;
transverse drive means for moving the head in a second axial direction parallel to the mat surface;
orthogonal drive means for moving the head in a third axial direction intersecting the mat surface;
the longitudinal, transverse, and orthogonal drive means forming a combined positioning means for controlling simultaneous movement of the head in the first, second, and third axial directions when cutting the mat;
the cutting blade being cuttingly inserted into and removed from the mat in a direction parallel to a preselected angle relative to the top surface of the mat to cut the opening precisely without making overcuts in the mat;
wherein the cutting blade is inclined relative to the top surface of the mat, and further comprising:
rotational drive means for controllably rotating the head about an axis perpendicular to the top surface of the mat to align the blade along a cutting path parallel to the top surface of the mat as the longitudinal and transverse drive means move the cutting blade along a curvilinear path to cut a smooth, continuously beveled periphery along the curvilinear path.

16. A device for cutting precision openings in mats used for framing artwork, comprising:
a cutting blade having a cutting edge for cutting an opening in a mat;
a variably positionable head for holding the cutting blade;
longitudinal drive means for moving the head in a first axial direction parallel to a top surface of the mat;
transverse drive means for moving the head in a second axial direction parallel to the top surface of the mat;
orthogonal drive means for moving the head in a third axial direction intersecting the top surface of the mat;
the longitudinal, transverse, and orthogonal drive means forming a combined positioning means for controlling simultaneous movement of the head in the first, second, and third axial directions when cutting the mat;
the cutting blade being cuttingly inserted into and removed from the mat in a direction parallel to a preselected angle relative to the top surface of the mat to cut the opening precisely without making overcuts in the mat;
wherein the cutting blade is inclined relative to the top surface of the mat, and further comprising:
rotational drive means for controllably rotating the head about an axis perpendicular to the top surface of the mat to align the blade along a cutting path parallel to the top surface of the mat as the longitudinal and transverse drive means move the cutting blade along an S-shaped curvilinear path to cut a smooth, continuously beveled periphery along the S-shaped curvilinear path.

17. A device for cutting precision openings in mats used for framing artwork, comprising:
a cutting blade having a cutting edge for cutting an opening in a mat;
a variably positionable head for holding the cutting blade;
longitudinal drive means for moving the head in a first axial direction parallel to a top surface of the mat;
transverse drive means for moving the head in a second axial direction parallel to the top surface of the mat;
orthogonal drive means for moving the head in a third axial direction intersecting the top surface of the mat;
the longitudinal, transverse, and orthogonal drive means forming a combined positioning means for controlling simultaneous movement of the head in the first, second, and third axial directions when cutting the mat;
the cutting blade being cuttingly inserted into and removed from the mat in a direction parallel to a preselected angle relative to the top surface of the mat to cut the opening precisely without making overcuts in the mat;
wherein the cutting blade is inclined relative to the top surface of the mat for cutting a beveled edge in the mat, and wherein the top surface of the mat is a finished side of the mat designed to be outwardly visible adjacent a framed work of art.

18. A device for cutting precision openings in mats used as a border for works of art, comprising:
a variably positionable head for holding a cutting blade for cutting a beveled peripheral edge in a framing mat to form an opening, the cutting blade being inclined relative to a top surface of the mat;
combined positioning means for moving the head, comprising:
longitudinal drive means for moving the head in a Y-axis direction;
transverse drive means for moving the head in an X-axis direction;
orthogonal drive means for moving the head in a Z-axis direction perpendicular to the X-axis and the Y-axis; and
rotational drive means for rotating the head about the Z-axis to change the direction of the cutting blade;
the combined positioning means moving the head simultaneously in the X-axis direction, the Y-axis direction, the Z-axis direction, and about the Z-axis to enable the opening to be made of one of a variety of sizes and shapes in the mat without overcutting beyond the beveled peripheral edge of the opening.

19. The mat cutting device of claim 18, further comprising:
a linear variable displacement transducer operatively coupled to the orthogonal drive means and connected to the head for sensing the top surface of the mat contemporaneously while cutting the mat, the linear variable displacement transducer maintaining the head a constant distance from the top surface of the mat so that the inclined blade cuts a smooth, continuous beveled edge in the mat.

20. The mat cutting device of claim 18 wherein the head comprises a removable blade support block for holding the cutting blade at a desired angle relative to the top surface of the mat to cut the beveled edge at the desired angle.

21. The mat cutting device of claim 18 wherein the head comprises a removable blade support block having an inclined surface for holding the cutting blade at a desired angle relative to the top surface of the mat to cut the beveled edge at the desired angle;
the removable blade support block being interchangeable with a replacement blade support block having a second angle to cut a beveled edge in the mat at the second angle.

22. The mat cutting device of claim 18 wherein the top surface is a finished side of the mat designed to be outwardly visible adjacent a framed work of art.

23. The mat cutting device of claim 18 wherein the cutting blade is a single-edge blade.

24. The mat cutting device of claim 18 wherein the combined positioning means enables the cutting blade to make decorative carvings in the mat.

25. The mat cutting device of claim 18 wherein the opening comprises a decorative carving.

26. A device for cutting precision openings in mats used as a border for works of art, comprising:
a variably positionable head for holding a single-edge cutting blade to cut an opening in the mat, the head including a blade support block having an inclined surface for holding the cutting blade at a preselected angle relative to a top surface of the mat so that the blade cuts a beveled edge in the mat at the preselected angle, the beveled edge forming the opening, the top surface being a finished side of the mat;
combined positioning means for moving the head, comprising:
longitudinal drive means for moving the head in a Y-axis direction;
transverse drive means for moving the head in an X-axis direction;
orthogonal drive means for moving the head in a Z-axis direction perpendicular to the X-axis and the Y-axis; and
rotational drive means for rotating the head about the Z-axis to change the direction of the cutting blade;
the combined positioning means moving the head simultaneously in the X-axis direction, the Y-axis direction, the Z-axis direction, and about the Z-axis to enable the opening to be made of one of a variety of sizes and shapes in the mat without overcutting beyond the beveled peripheral edge of the opening; and
a linear variable displacement transducer operatively coupled to the orthogonal drive means and connected to the head for sensing the top surface of the mat contemporaneously while cutting the mat, the linear variable displacement transducer maintaining the head a constant distance from the top surface of the mat so that the blade cuts a smooth, continuous beveled edge in the mat.

27. The mat cutting device of claim 26 wherein the beveled edge is cut along a curvilinear line.

28. The mat cutting device of claim 26 wherein the beveled edge is cut along a S-shaped curvilinear line.

29. The mat cutting device of claim 26 wherein multiple, separate openings are cut into the mat without moving the mat.

30. The mat cutting device of claim 26 wherein decorative carvings comprised of any combination of curvilinear or linear lines are carved into the mat by the cutting blade.

31. The mat cutting device of claim 26 wherein the combined positioning means enables the cutting blade to make decorative carvings in the mat.

32. The mat cutting device of claim 26 wherein the opening comprises a decorative carving.

33. A method of cutting a precision opening in a mat used in framing artwork, comprising the steps of:
provided a mat for use in connection with framing works of art;
securing the mat to a working surface;
providing a cutting blade oriented at a preselected angle relative to a top surface of the mat for cutting an opening in the mat; simultaneously and controllably moving the cutting blade in a longitudinal Y-axis direction, a transverse X-axis direction, and an orthogonal Z-axis direction to cuttingly insert the cutting blade into the mat to form a precise entrance cut without an overcut;
moving the cutting blade along a path defining the opening; and
simultaneously and controllably moving the blade in the longitudinal Y-axis direction, the transverse X-axis direction, and the orthogonal Z-axis direction to cuttingly remove the cutting blade from the mat at a precise exit cut which corresponds to the entrance cut such that no overcutting of the mat occurs.

34. The method of claim 33 wherein the preselected angle is less than 90°, the method further comprising the step of:
maintaining the cutting blade at a constant depth within the mat for cutting a continuously smooth beveled edge in the mat.

35. The method of claim 33 wherein the preselected angle is less than 90°, the method further comprising the steps of:
monitoring the depth of the cutting blade into the mat as the mat is being cut; and
maintaining the cutting blade at a constant depth within the mat for cutting a continuously smooth beveled edge in the mat.

36. The method of claim 33 wherein the preselected angle is less than 90°, the method further comprising the steps of:
moving the cutting blade along a curvilinear path;
rotating the cutting blade as the cutting blade passes along the curvilinear path so that a continuously smooth beveled edge is formed about the curvilinear path.

37. The method of claim 33, further comprising the step of calibrating the cutting blade at a calibration location prior to cutting the mat.

* * * * *